United States Patent [19]
Hashida et al.

[11] Patent Number: 5,477,878
[45] Date of Patent: Dec. 26, 1995

[54] FLOW CONTROL VALVE

[75] Inventors: Koichi Hashida; Masato Yoshino, both of Itami, Japan

[73] Assignee: Sumitomo Electric Industries, Ltd., Osaka, Japan

[21] Appl. No.: 261,109

[22] Filed: Jun. 16, 1994

[30] Foreign Application Priority Data

Jun. 22, 1993 [JP] Japan .................... 5-150343

[51] Int. Cl.⁶ ............................................. G05D 16/20
[52] U.S. Cl. .................................. 137/504; 251/368
[58] Field of Search ................... 137/503, 504; 251/368

[56] References Cited

U.S. PATENT DOCUMENTS

| | | | |
|---|---|---|---|
| 2,441,220 | 5/1948 | Dixon ............................. | 137/504 |
| 2,633,147 | 3/1953 | Badami . | |
| 2,938,704 | 5/1960 | Quail ............................. | 251/368 |
| 2,984,261 | 5/1961 | Kates ............................. | 137/504 X |
| 3,112,764 | 12/1963 | Anderson et al. .............. | 137/504 |
| 3,188,048 | 6/1965 | Sutherland ..................... | 251/368 |
| 4,648,424 | 3/1987 | Takahashi et al. ............. | 137/504 |
| 5,181,534 | 1/1993 | Hashida et al. ................ | 137/504 X |
| 5,280,805 | 1/1994 | Skoglund ....................... | 137/504 |

FOREIGN PATENT DOCUMENTS

| 0356185 | 2/1990 | European Pat. Off. . |
|---|---|---|
| 0434092 | 6/1991 | European Pat. Off. . |

*Primary Examiner*—Stephen M. Hepperle
*Attorney, Agent, or Firm*—Wenderoth, Lind & Ponack

[57] ABSTRACT

A flow control valve having a housing having a first port and a second port and a spool mounted in the housing. A first fluid chamber and a second fluid chamber which impart a fluid pressure to both ends of the spool communicate with each other through a fluid passage formed with an orifice. As the spool moves, thrust to the spool produced by a difference in pressure at both ends of a spool balances with a biasing force produced by the biasing mechanism. The flow control valve is provided with an annular seal made of an elastic material together with a seal member. When the edge of the land portion on the outer periphery of the spool is brought into contact with the annular seal, the first port is completely shut off from the second fluid chamber. Thus, leakage will become zero when the valve portion is closed.

2 Claims, 5 Drawing Sheets

FLOW CONTROL VALVE

BACKGROUND OF THE INVENTION

This invention relates to a flow control valve used in a fluid pressure system, e.g. in a brake system for automobiles, which a high-pressure, low-viscosity fluid has to be controlled precisely over a wide range of flow rates.

FIG. 5 shows a flow control valve proposed in Japanese Unexamined Patent Publication 3-223578 by the present applicant. It comprises a housing 1 having a first port 2 and a second port 3, a spool 4 slidably mounted in the housing, a first fluid chamber 5 and a second fluid chamber 6 in which fluid pressure can be generated on both ends of the spool from opposite directions, a fluid passage 8 having an orifice 7 through which the first and second fluid chambers 5 and 6 communicate with each other, the second fluid chamber 6 further communicating with the second port 3, and a valve portion 9 controlling the fluid flow between the first port 2 and the first fluid chamber 5 as the spool 4 moves in an axial direction.

With the automatic opening adjustment effect of the valve portion 9 in this flow control valve, a thrust to the spool produced by the difference in fluid pressure in the first and second fluid chambers 5 and 6 balances with the biasing force of biasing means 10. The flow determined by the difference in pressure and the sectional area of the orifice is introduced from the first port 2 through the orifice 7 to the second port 3.

In the conventional flow control valve, when the valve portion is closed, since the path from the first port to the first fluid chamber is closed by the annular seal, the flow rate can be controlled precisely even in low-flow area. However, some amount of leakage is inevitable through the gap between the spool and the housing from the first port to the second fluid chamber. Although the leakage can be reduced by narrowing the gap, it is impossible to reduce it to zero. Therefore, the advantage of precise control by use of the annular seal is not sufficiently utilized. The application of the flow control valve is thus limited.

SUMMARY OF THE INVENTION

It is an object of the present invention to provide a flow control valve which obviates this problem.

In order to solve this problem, according to the present invention, a seal member is provided to seal the outer periphery of the spool between the first port and the second fluid chamber.

The seal member used in this invention should preferably be made mainly of polytetrafluoroethylene (PTFE) .

When the valve portion is closed, the first port is shut off from the first and second fluid chambers by the provision of the annular seal and the seal member, respectively. This makes it possible to achieve a good sealability. The sliding resistance produced by the provision of the seal member will be one of the factors which impair the accuracy of the flow control. However, since the seal member is made mainly of PTFE, the increase in sliding resistance is kept to minimum.

BRIEF DESCRIPTION OF THE DRAWINGS

Other features and objects of the present invention will become apparent from the following description made with reference to the accompanying drawings, in which:

Referring to FIG. 1, the valve comprises a housing 1 having a first port 2 and a second port 3, a spool 4, a first fluid chamber 5 which supplies the fluid to the first port 2, and a second fluid chamber 6 which communicates with the second port 3.

Figure 1:
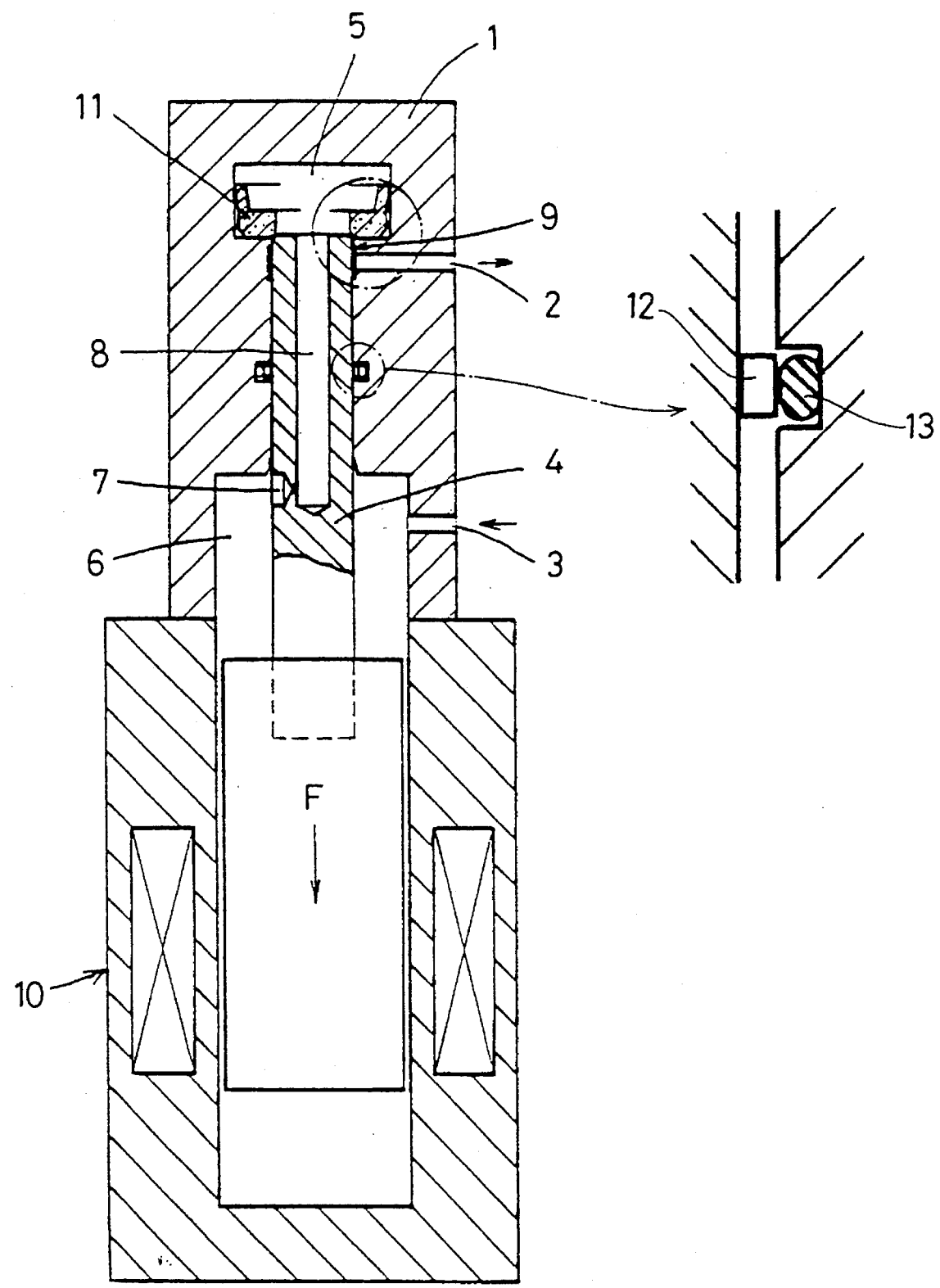
FIG. 1 is a sectional view of one embodiment of a flow control valve according to the present invention.

The first and second fluid chambers 5 and 6 communicate with each other through a fluid passage 8 having an orifice 7. In the embodiment, the fluid passage 8 is formed in the spool 4, but it may be formed instead in the housing 1. A valve portion 9 opens and closes the passage by moving the spool 4 relative to a land portion formed on the inner periphery of the housing 1. The fluid from the first fluid chamber 5 is introduced to the first port 2 through the valve portion 9.

A biasing means 10 urges the spool 4 downward in the figure. In the embodiment, an electromagnet is used as the biasing means. Its biasing force is adjustable by changing the exciting current with an electronic control.

In the first fluid chamber 5 is mounted an annular seal 11 made of an elastic material so as to be brought into contact with the end of the spool 4.

A slipper seal 12 made of PTFE is attached to the outer periphery of the spool 4 between the first port 2 and the second fluid chamber 6. It is sealed due to the elastic force of an O-ring 13 fitted in a groove formed in the inner periphery of the housing 1. In this embodiment, the second port 3 serves as an inlet port, whereas the first port 2 serves as an outlet port.

In the flow control valve described above, when the biasing force F exerted by the biasing means 10 is zero, the spool 4 is kept at its upper end in the first fluid chamber 5 and brought into contact with the annular seal 11. In this state, the fluid flow between the second port 3 as the inlet and the first port 2 as the outlet becomes zero even including any leakage.

Figure 2A:
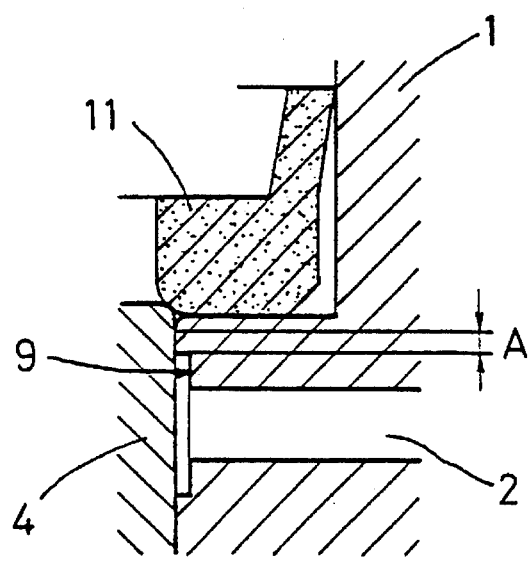
FIG. 2A–2C are enlarged views of a portion of the valve encircled in FIG. 1 showing how the spool changes its position.
Figure 2B:
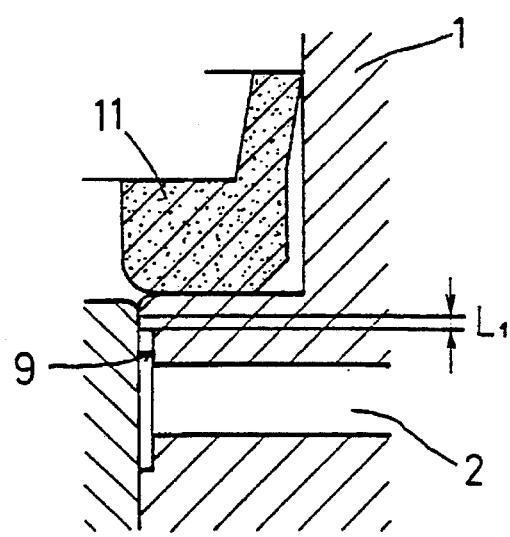
Figure 2C:
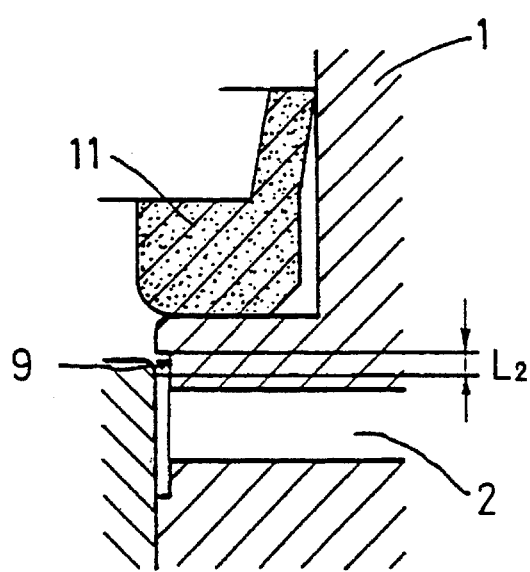

Next, when a biasing force F is exerted by the electromagnet, the spool 4 will be moved down to automatically adjust the opening of the fluid passage from the first fluid chamber 5 to the first port 2. If the biasing force F is extremely weak, this adjustment is made between the annular seal 11 and the spool 4 (FIG. 2A). If it is relatively weak, this adjustment is carried out by changing the overlapping length L1 between the land portion on the outer periphery of the spool and the land portion on the inner periphery of the housing (FIG. 2B). If the biasing force F is large, the adjustment is carried out by adjusting the opening length L2 of the first port 2 (FIG. 2C).

Due to this automatic opening adjustment, the difference in fluid pressure between the second fluid chamber 6 and the first fluid chamber 5 always balances with the biasing force F. Therefore, the flow (passing through the valve portion) determined by the difference in pressure and the sectional area of the orifice 7 depends on the biasing force F.

The sliding resistance to the spool by the seal 12, added to the biasing force F, decreases the accuracy of flow control. However, if the seal is made of PTFE, the sliding resistance offered by the seal will be small relative to the biasing force F. The effect by the provision of the seal is very small.

Figure 3:
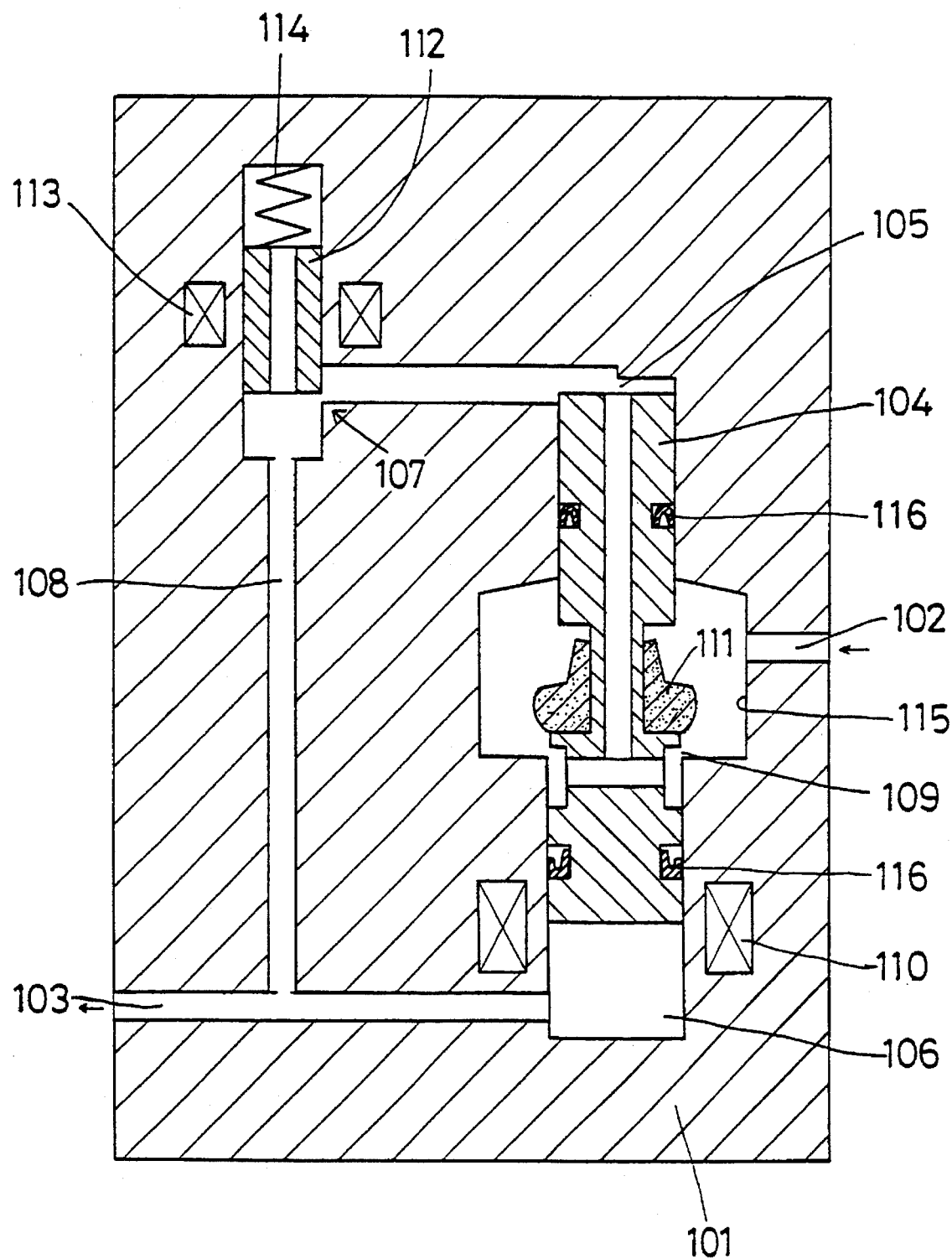
FIG. 3 is a sectional view of another embodiment.

FIG. 3 shows a second embodiment of this invention.

Referring to this figure, the valve comprises a housing 101 having a first port 102 used as an inlet port and a second port 103 as an outlet port, a spool 104, a first fluid chamber 105, and a second fluid chamber 106 which leads to the second port 103. The first and second fluid chambers 105 and 106 communicate with each other through a fluid passage 108 having an orifice 107.

The orifice 107 has a variable sectional area, defined by the housing 101 and a valve body 112. The sectional area of the passage varies as the valve body 112 moves to balance the electromagnetic force, created by supplying electric current to a coil 113, with the force of a spring 114. A valve portion 109 opens and closes the passage between the first port 102 and the first fluid chamber 105 by opposing the land portion on the inner periphery of the housing 101 to the land portion on the outer periphery of the spool 104.

A biasing means 110 urges the spool 104 upward in the figure. In this embodiment, an electromagnetic coil is used as the biasing means to produce a force corresponding to the exciting current.

An annular seal 111 made of an elastic material is sealably secured in a groove formed in the outer periphery of the spool 104 so that it can be brought into contact with the edge of the land portion of the housing 101 inside a third fluid chamber 115 whose diameter is larger than that of the seal 111.

Cup seals 116 serve to seal the outer periphery of the spool 104 between the first port 102 and the second fluid chamber 106 and between the first port 102 and the first fluid chamber 105. They prevent the fluid from leaking through the gaps.

In the second embodiment, the annular seal 111 is mounted on the spool 104. Both the biasing means and the orifice 107 are adjustable. Also, two cup seals are provided to seal the gap around the outer periphery of the spool. However, the function and effect of the second embodiment are substantially the same as the first embodiment except that the provision of variable orifice allows flow control over a wider range.

Figure 4:
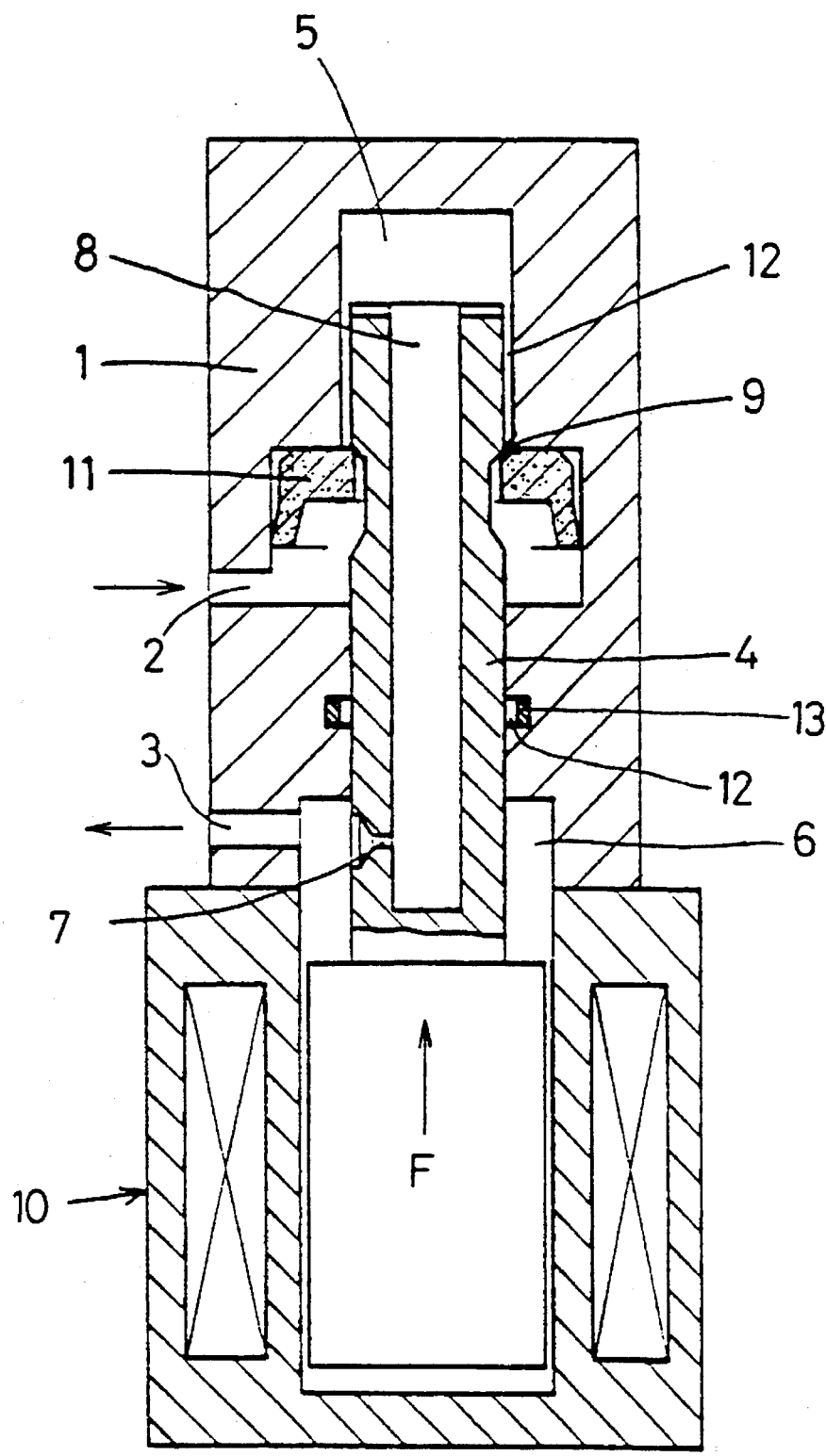
FIG. 4 is a sectional view of a still another embodiment.
Figure 5:
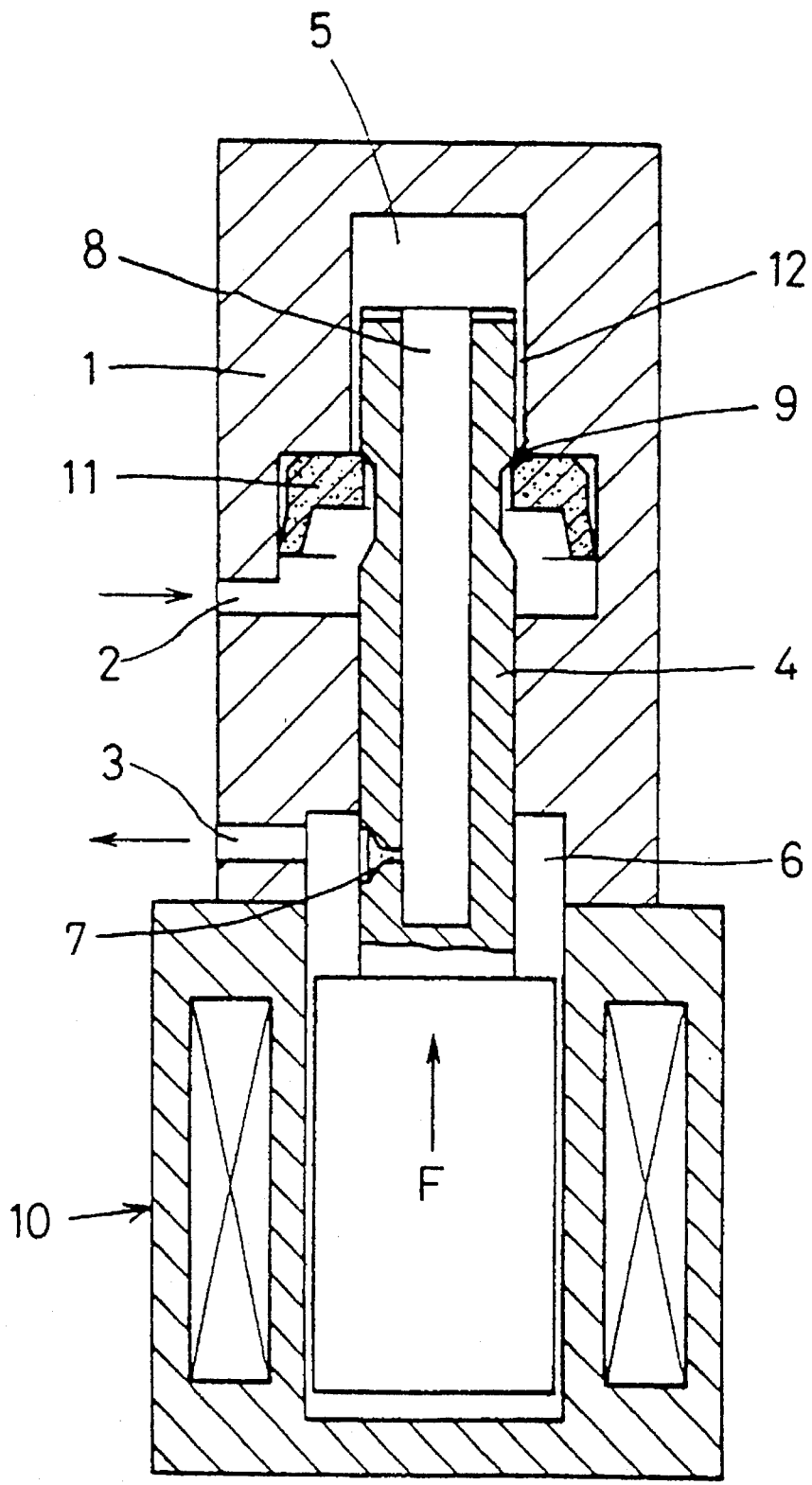
FIG. 5 is a sectional view of a prior art flow control valve.

FIG. 4 shows a flow control valve in which the present invention is applied to the prior art valve shown in FIG. 5. The gap at the outer periphery of the spool is sealed by the seal 12 and the O-ring 13. The gap may be sealed alternatively by a cup seal.

The position of the annular seal, the mounting method position of the seal member, and whether the spool biasing force is adjustable, and whether the sectional area of the orifice is adjustable can be decided according to the nature of the fluid and the desired flow range. If both the biasing force and the sectional area of the orifice are adjustable, one of them may be changed over in two steps, whereas the other may be adjustable steplessly.

Moreover, the flow control valve employing the present invention is not limited to the above-described embodiments. For example, this invention may be applied to the valve disclosed in Japanese Unexamined Patent Publication 3-234987 by the present applicant.

As described above, the flow control valve of this invention solves the problem of the leakage through the gap around the outer periphery of the spool. While making use of the advantages of the spool type control valve, that is, the simple structure and low cost, it is also possible to maintain a high flow control accuracy. Thus, it can be applied in a wider range. Since the seal member is made mainly of PTFE, even if the seal member is provided, undue an influence on the precision of the flow control will be kept to a minimum. Thus, it can meet the requirement of high control accuracy.

What is claimed is:

1. A flow control valve comprising: a housing having a first port, a second port, an inner peripheral wall, and a groove formed in the peripheral wall; a spool slidably mounted in said housing; a first fluid chamber and a second fluid chamber in which fluid pressure can be generated on both ends of said spool, respectively; a fluid passage formed with an orifice and through which said first fluid chamber and said second fluid chamber communicate with each other, said second port communicating with said second fluid chamber; a valve portion for controlling the fluid flow between said first port and said first fluid chamber as said spool moves in an axial direction; an annular seal made of an elastic material, said annular seal being mounted in said groove formed in the inner peripheral wall of said housing, and said valve portion being closed by bringing a land at an end of said spool into contact with said annular seal; biasing means for biasing said spool in one direction, the biasing force of said biasing means balancing with a thrust to said spool produced by a difference in fluid pressure between said first and second fluid chambers, and at least one of the biasing force of said biasing means and the opening of said orifice being adjustable; and a seal member sealing a gap around the outer periphery of said spool between said first port and said second fluid chamber, said seal member being made mainly of polytetrafluoroethylene.

2. A flow control valve comprising: a housing having a first port and a second port; a spool slidably mounted in said housing, said spool having a groove formed in the outer periphery thereof; a first fluid chamber and a second fluid chamber in which fluid pressure can be generated on both ends of said spool, respectively; a fluid passage formed with an orifice and through which said first fluid chamber and said second fluid chamber communicate with each other, said second port communicating with said second fluid chamber; a valve portion for controlling the fluid flow between said first port and said first fluid chamber as said spool moves in an axial direction; an annular seal made of an elastic material, said annular seal being mounted in said groove formed in the outer periphery of said spool, said valve portion being closed by bringing said annular seal into contact with a land formed on the inner periphery of the housing; biasing means for biasing said spool in one direction, the biasing force of said biasing means balancing with a thrust to said pool produced by a difference in fluid pressure between said first and second fluid chambers, and at least one of the biasing force of said biasing means and the opening of said orifice being adjustable; and a seal member sealing a gap around the outer periphery of said spool between said first port and said second fluid chamber, said seal member being made mainly of polytetrafluoroethylene.

* * * * *